(12) United States Patent
Gutierrez et al.

(10) Patent No.: US 8,078,197 B2
(45) Date of Patent: Dec. 13, 2011

(54) LOCATION-BASED SEARCH-RESULT RANKING FOR BLOG DOCUMENTS AND THE LIKE

(75) Inventors: Francisco Gutierrez, Munich (DE); Assaf Landschaft, Munich (DE); Michael Sprenglewski, Taufkirchen (DE)

(73) Assignee: Agere Systems Inc., Allentown, PA (US)

( * ) Notice: Subject to any disclaimer, the term of this patent is extended or adjusted under 35 U.S.C. 154(b) by 894 days.

(21) Appl. No.: 12/034,385

(22) Filed: Feb. 20, 2008

(65) Prior Publication Data

US 2009/0209270 A1    Aug. 20, 2009

(51) Int. Cl.
*H04W 24/00* (2009.01)
(52) U.S. Cl. ............... 455/456.3; 707/1; 707/3; 707/10; 707/11
(58) Field of Classification Search ............... 455/187.1, 455/404.2, 414.2, 414.3, 415, 456.1, 456.2, 455/456.3; 707/3, 1, 10, 11
See application file for complete search history.

(56) References Cited

U.S. PATENT DOCUMENTS

| | | | |
|---|---|---|---|
| 6,668,353 | B1 | 12/2003 | Yurkovic |
| 7,634,463 | B1 * | 12/2009 | Katragadda et al. ............... 1/1 |
| 2005/0080786 | A1 * | 4/2005 | Fish et al. ................. 707/10 |
| 2007/0061297 | A1 | 3/2007 | Bihun et al. |
| 2009/0043646 | A1 * | 2/2009 | Pingali et al. .................. 705/11 |
| 2009/0177384 | A1 * | 7/2009 | Walder ......................... 701/208 |

FOREIGN PATENT DOCUMENTS

EP    0 889 421 A1    1/1999

OTHER PUBLICATIONS

Brown, P.J., "The Stick-E Document: A Framework for Creating Context-Aware Applications," Electronic Publishing, vol. 8, Nos. 2-3, Sep. 24, 1996, pp. 259-272, Retrieved from the Internet: <URL: http://cajun.cs.nott.ac.uk/compsci/epo/papers/volume8/issue2/2point1.pdf> [retrieved on Feb. 15, 2008].

(Continued)

*Primary Examiner* — Kent Chang
*Assistant Examiner* — Dinh Nguyen
(74) *Attorney, Agent, or Firm* — Mendelsohn, Drucker & Associates, P.C.; Edward J. Meisarosh; Steve Mendelsohn

(57) ABSTRACT

In one embodiment, a mobile communication device is adapted to provide geography-enhanced blog search results. In response to a blog-search query entered by a user, the mobile communication device is adapted to determine a current geographical location for the mobile communication device and a home location for the user. The mobile communication device is further adapted to provide the current location and home location information along with the search query parameters to a search engine. The search engine is adapted to provide results corresponding to blog posts that satisfy the parameters of the search query, wherein the search results are ranked based on at least one of (a) the geographic proximity of a blog post subject to the current location and (b) the geographic proximity of a blog post author's home location to the user's home location.

22 Claims, 2 Drawing Sheets

OTHER PUBLICATIONS

Voelker, G.M., "Mobisaic: An Information System for a Mobile Wireless Computing Environment," Sep. 19, 1994, Retrieved from the Internet: <URL: http://citeseer.ist.psu.edu/cache/papers/cs/1712/http:zSzzSzwww.cs.washington.eduzSzhomeszSzvoelkerzSzmobisaiczSzpostscriptzSzmobile94-submit.pdf/voelker94mobisaic.pdf> [retrieved on Feb. 15, 2008] (7 pages).

European Search Report dated Mar. 31, 2005, from European Publication No. EP 1 039 397 A3, (4 page).

Schmidt, A. et al., "There is More to Context than Location," Retrieved from the internet: <URL: http://www.comp.lancs.ac.uk/~albrecht/pubs/pdf/schmidt_cug_elsevier_12-1999-context-is-more-than-location.pdf.> [retrieved on Feb. 15, 2008].

* cited by examiner

100

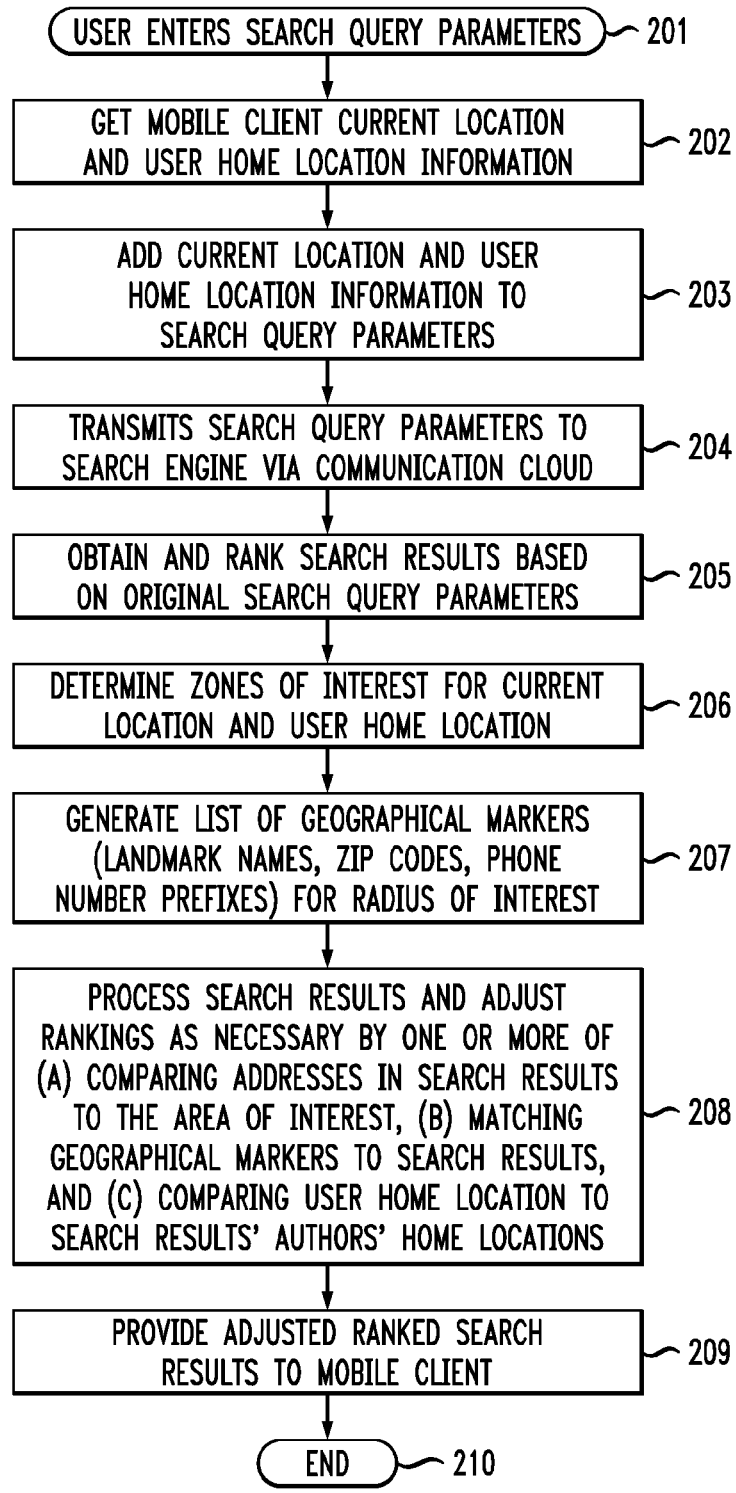

LOCATION-BASED SEARCH-RESULT RANKING FOR BLOG DOCUMENTS AND THE LIKE

BACKGROUND OF THE INVENTION

1. Field of the Invention

The current invention relates to information retrieval, and, in particular, to providing ranked results in response to a search query, such as an Internet-based blog search.

2. Description of the Related Art

The Internet is a network of networks that provides access to innumerable instances of many types of information. One segment of the Internet is the world-wide web (www), which is a collection of interlinked hypertext documents and services accessible via uniform resource locator (URL) addresses. The web comprises many types of information since any information that can be transmitted digitally can be provided via the web. One category of information available on the web, i.e., online, is the blog, which is a word derived from the term "web log."

A blog is an online journal whose contents is provided by a blogger. The blogger is often an individual, but can also be a group of individuals. A blog is updated through posts provided by the blogger. Posts typically comprise text and graphics, but can also include any information that can be digitized, such as audio and video. Some blogs are dedicated to a single topic, such as restaurant reviews or political commentary, while other blogs cover multiple topics, as dictated by their bloggers' whims. Most blogs are hosted by specialized blog websites, such as Blogger, at www.blogger.com, or Wordpress, at wordpress.org. Such specialized blog websites simplify creating, maintaining, and posting to blogs.

Blogs may contain information that is useful to a user researching a topic online. Users can research the topic online by entering search terms in a search engine such as Google, at www.google.com, or Yahoo!, at www.yahoo.com. Blog posts, which are online documents, are typically searchable by search engines, and search engines are often able to determine whether a retrieved document that matches the particular search criteria is a blog document or not. Search engines can typically access metadata for a blog post, where metadata in an online document is information that is not readily visible to a user browsing the online document. Blog metadata can include information about the blogger, such as the blogger's nominal home location. Individual blog posts can also contain metadata. A particular blog post can include location information pertinent to that blog post in its readily visible text. The blog post can also include location and other information in metadata associated with the blog post.

Blogs and blog posts vary enormously in utility to a user performing an online search. Some blog posts include a blogger's thoughtful and accurate assessment of a topic. Blogs comprising such blog posts can be considered high-quality blogs and can be useful to others interested in subjects that high-quality blogs discuss. Some blog posts are rants or paeans that provide a misleading overview of their subject. Blogs substantially composed of such blog posts can be considered low-quality blogs and are not likely to be useful to others interested in the subjects discussed by the low-quality blogs. There are known methods for providing an assessment of the quality of a blog based on measurable factors. For example, the number of links to/from the blog from/to known high-quality sources can be used as an indicia of quality since high-quality sources are likely to direct their readers to other high-quality sources, or at least not to low-quality sources. Conversely, links to/from the blog from/to known low-quality sources can indicate a low-quality blog since low-quality sources are likely to direct their readers to other low-quality sources.

As new blog posts continue to be posted, either to existing blogs or new blogs, novel ways of ranking search results may increase the likelihood that the most relevant results are the results that are displayed first to the user performing the search. This is particularly true for a user who performs the search from a mobile device, with which investigating less-relevant results is likely more wasteful of the user's and device's resources.

SUMMARY OF THE INVENTION

One embodiment of the invention can be a computer-implemented search engine for a communication network having a communication device with a current location. The search engine adapted to: (a) receive from the communication device a search query having one or more search parameters provided by a user of the communication device, (b) receive location information corresponding to the communication device, wherein the location information indicates at least one of (i) the current location of the communication device and (ii) a home location for the user of the communication device, (c) search a computer-accessible collection of documents using the one or more search parameters to obtain two or more search results, wherein each of the two or more search results corresponds to a different document in the collection of documents, (d) rank the search results based on the location information, and (e) transmit at least some of the ranked search results to the communication device.

Another embodiment of the invention can be a communication device having a current location and adapted to: (a) allow a user of the communication device to provide a search query having one or more search parameters, (b) automatically acquire location information indicating at least one of (i) the current location of the communication device and (ii) a home location for the user of the communication device, (c) transmit the search query and the location information via a communication network to a search engine, and (d) display the received ranked search results. The search engine is adapted to: (1) search a collection of documents using the one or more search parameters to obtain two or more search results, wherein each of the two or more search results corresponds to a different document in the collection of documents, (2) rank the search results based on the location information, and (3) transmit at least some of the ranked search results to the communication device.

Yet another embodiment of the invention can be a computer-implemented method for providing search results ranked based on location. The method comprises: (a) receiving a search query having one or more search parameters provided by a user of a communication device having a current location, (b) receiving location information corresponding to the communication device, wherein the location information indicates at least one of (i) the current location of the communication device and (ii) a home location for the user of the communication device, (c) searching a computer-accessible collection of documents using the one or more search parameters to obtain two or more search results, wherein each of the two or more search results corresponds to a different document in the collection of documents, (d) ranking the search results based on the location information, and (e) transmitting at least some of the ranked search results to the communication device.

BRIEF DESCRIPTION OF THE DRAWINGS

Other aspects, features, and advantages of the present invention will become more fully apparent from the following FIG. 2 shows a flow chart for an exemplary operation of the communication system of FIG. 1.

DETAILED DESCRIPTION

Figure 1:
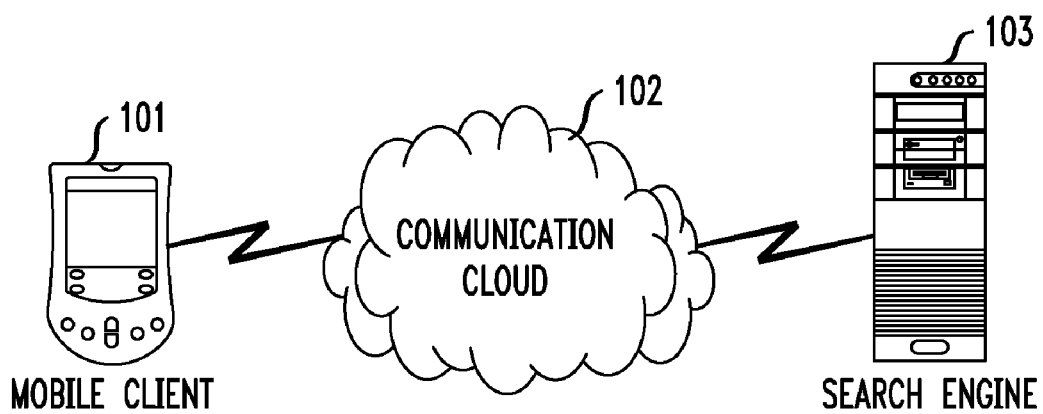
FIG. 1 shows a simplified mobile communication system in accordance with one embodiment of the present invention

Some mobile communication devices allow their users to perform online searches. This can be a useful feature for a traveling user, allowing the user to look up information while at any one of a multitude of locations. One embodiment of the invention includes a mobile communication device that, when performing an online search, automatically sends information about its, and thus, also its user's, current location and about the user's home location to the search engine. The search engine uses that location information as a factor in ranking and arranging the search results so that results that are more geographically relevant are ranked higher than otherwise-similar results that are less geographically relevant.

Geographic relevancy is measured in terms of proximity of (1) blog post subject location to the communication device's current location, and (2) blogger's, i.e., document-author's, home location to the user's home location. The particular weight given each factor can vary by implementation and by the particular locations involved. Thus, if a blog search returns a set of blog posts including two blog posts that are otherwise similar in their rank based on the entered search terms, then the blog post whose blogger is from near the user's home location and whose contents relates to a location close to the user's current location will be ranked higher. Thus, the highest-ranked relevant results will be those about the user's current location and by someone from the user's home location since those are most likely to provide pertinent content from someone likely to have a similar perspective.

For example, if a user whose home location is Melbourne visits Philadelphia and searches for "tasty pizza," then a blog post about tasty pizza in Philadelphia by a blogger from Sydney might rank higher than a blog post about tasty pizza in Philadelphia by a blogger from Munich. The latter blog post would, however, rank higher than a blog post about tasty pizza in Baltimore by a blogger from Melbourne since the presumably hungry user would be more interested in information about tasty pizza in his or her current location of Philadelphia than a fellow Melburnian's perspective on pizza choices in somewhat-distant Baltimore.

The geographic relevancy rankings can be combined with other result rankings to determine a final display order provided to the user. For example, search results can first be ranked based on (1) the relevance of the search parameters to particular search results, and (2) the calculated quality of the particular search results. Then the rankings of the search results can be modified by the geographic relevancy rankings, such that the final result ranking provided to the user is based on all three factors noted above. Additional factors can also be used in determining the final result ranking provided to the user.

FIG. 1. shows simplified mobile communication system 100 in accordance with one embodiment of the present invention. Communication system 100 comprises mobile client 101 communicatively connected to network communication cloud 102, which in turn is communicatively connected to search engine 103. Network communication cloud 102 (1) functions to communicatively connect mobile client 101 to search engine 103 and (2) can comprise one or more of the Internet, the public switched telephone network (PSTN), cellular communication networks, Wi-Fi networks, Bluetooth® networks, and other wired and wireless communication networks.

Mobile client 101 is an electronic mobile communication device such as an Internet-enabled cellular phone. Mobile client 101 is adapted to determine its geographic location using any suitable method for locating a device. Suitable locating methods include one or more of (a) using GPS (global positioning system), (b) using cell identification in a cellular network, (c) requesting a location determination from a cellular network such as communication cloud 102, and (d) determining location based on the known location of a nearby network node. When a user of mobile client 101 wishes to perform an information search, the user enters search parameters into a search engine using mobile client 101. Mobile client 101 automatically determines its current location and transmits the location information along with the search parameters to search engine 103 via communication cloud 102. The transmitted location information can be identified as location information, or, alternatively, can be appended to the search parameters as one or more additional parameters. Information-identification can be performed, for example, by placing the location information in a dedicated and known address field of a datagram, or by dynamically identifying the location information as such in the datagram. An example of dynamic identification would be the addition of tags to the location information, similar to a use of tags in HTML, XML, and other markup languages.

Search engine 103 performs an Internet search based on the information received from mobile client 101. Using any suitable methodology for online document searching, search engine 103 performs a search for relevant documents based on the original search parameters—i.e., excluding the automatically added location information. The search results are ranked by relevance to the search parameters, as determined by the particular search engine algorithm used. Search engine 103 then adjusts the rankings of the results as needed based on content location information deduced from the search results and the location information received. Search engine 103 then provides links to the top-ranked results to mobile client 101 for display to the user. Each link may be accompanied by text describing the linked result document or a thumbnail image of content from that document. The links are preferably provided by search engine 103 to mobile client 101 in batches of limited size in order to avoid squandering limited communication resources transmitting unneeded data.

For example, if 5 million relevant results are found by search engine 103, then search engine 103 would first send to mobile client 101 a batch with links to the top ten results. If the user indicates he or she wishes to see additional results, then mobile client 101 sends a request to search engine 103 for the next batch, and search engine 103 responds with another batch of links for the next ten results. The total number of top-ranked results provided by search engine 103 to mobile device 101 can be as high as the total number of relevant results found by the search engine, 5 million in this example, or can be limited to a number that is predetermined, dynamically selected, or dynamically calculated.

FIG. 2 shows flowchart 200 for an exemplary operation of communication system 100 of FIG. 1, where location information is to be automatically acquired. It should be noted that mobile client 101 can be set to not automatically acquire and/or send location information. Reasons to not automatically acquire and/or send location information can include one or more of the following: (a) the user disables the feature, (b) the entered search parameters include location information which may conflict with the current location, and (c) the feature is disabled by a service provider. The procedure starts when a user enters search query parameters into mobile client 101 (step 201). Next, mobile client 101 gets current location information for itself and home location information for the user (step 202).

Mobile client 101 then adds the current location information and user home location information to the search parameters, including some indication of which location information corresponds to which location type (step 203). It should be noted that, in implementations that do not consider the user's home location, it is less important to indicate location information correspondence since the location information appended is only current location information. Mobile client 101 then transmits the augmented search parameters to search engine 103 via communication cloud 102 (step 204).

Search engine 103 uses the originally entered search parameters to perform a blog search for relevant blog posts and rank the results based on relevance to the originally entered search parameters (step 205). It should be noted that this step can also be performed after step 206, after step 207, or in parallel with one or both of them, rather than after step 204.

Search engine 103 uses the current location information provided by mobile client 101 to determine one or more client zones of interest for the current location and one or more user home zones of interest for the user home location (step 206). A primary zone of interest is the geographical area that will provide the highest rankings to relevant search results. One simple form of a primary zone of interest is a circle of predetermined radius around a location, where secondary, tertiary, and further zones of interest are concentric rings of increasing radii around the location. More advanced zones of interest are based on geographic information available to search engine 103.

For example, if the current location is in a metropolitan downtown area, then the primary zone of interest might be an area of several blocks around the current location. While, if the current location is in a rural area, then the primary zone of interest would be substantially a circle of several miles around the current location. Search engine 103 can maintain a database of predetermined zones of interest, such as malls, so that, if the current location is within a predetermined zone of interest, then the primary zone of interest is set to be equal to the predetermined zone of interest.

If mobile client 101 also provides current location information sufficient to determine mobile client 101's velocity, i.e., mobile client 101's speed and direction of travel, then search engine 103 can provide further customizations of zones of interest. For example, if search engine 103 determines that mobile client 101, and hence the user, is traveling along a particular highway, then the client primary zone of interest might be a relatively narrow strip along the highway located in front of mobile client 101. The client secondary, tertiary, and additional zones of interest might be additional strips further along the highway, or may be more complicated shapes determined by the geography of the current location.

Similar customization can be performed on the user home primary zone of interest. If the user home location is Melbourne, then a primary user home zone of interest can comprise the city of Melbourne, a secondary user home zone of interest can comprise the state of Victoria, and a tertiary home zone of interest can comprise the entire country of Australia.

Using at least the primary client zone of interest, search engine 103 generates a list of geographical markers to be used in determining whether individual search results, particularly those that do not have address information, correspond to zones of interest (step 207). Geographical markers include names of landmarks, postal (ZIP) codes, and telephone numbers. For example, if mobile client 101 is in mid-town Manhattan, corresponding landmarks may include "Empire State Building," "Rockefeller Center," "Radio City Music Hall," "Times Square," and "Broadway," while corresponding postal codes can include 10019 and 10036, and corresponding phone numbers can include "212-839-xxxx," "212-273-xxxx," and others. Corresponding phone numbers for a zone of interest can generally be determined from PSTN information, such as the Local Exchange Routing Guide (LERG) for the North American Numbering Plan (NANP) provided by Telcordia Technologies, Inc., of Piscataway, N.J. The LERG provides information about locations of telephone company switches for landlines, which can be used to approximately locate the landline customer.

Using the zones of interest and the geographical markers, search engine 103 processes the search results from step 205 and adjusts the rankings as necessary (step 208). Ranking adjustments can be determined by one or more of the following: (a) comparing addresses in the search results to the zones of interest, (b) matching geographical markers to content location information in the search results, and (c) comparing the user home location to the determined home locations of the authors of the search results' blog posts (step 208). It should be noted that, in some search results, for example, semantic-web documents, address information may be tagged as such, and search engine 103 can speed up processing by using such tags that are in the search results. At least the top adjusted ranked search results are then provided to mobile client 101 via communication cloud 102 (step 209). The results are preferably provided as descriptive links displayed to the user by mobile client 101. The procedure is then terminated (step 210).

A particular embodiment of the invention has been described using online blogs and blog posts. However, the invention is not limited to the web or to blogs and blog posts. As would be appreciated by one of ordinary skill in the art, the invention is applicable to any collection of documents where at least some of the documents are associated with location information. Such location information for a document may be included in the document text, in document metadata, or in a data unit associated elsewhere, as in a data table, with the document.

A particular embodiment of the invention has been described wherein mobile client 101 provides location information along with search query parameters to search engine 103. In one alternative implementation, a component of communication cloud 102, such as a cellular network computer, determines the location of mobile client 101 and adds that location information to the query submitted by mobile client 101 to search engine 103. The current location of mobile client 101 can be determined, for example, by analyzing transmissions from mobile client 101.

A particular embodiment of the invention has been described wherein mobile client 101 provides user home location information along with search query parameters to search engine 103. In one alternative embodiment, a component of communication cloud 102, such as a cellular network computer, determines the home location for the user of mobile communication device 101 and adds that information to the query submitted by mobile client 101 to search engine 103. A cellular network computer may be able to determine a user's home location by, for example, using the billing information of the cellular network provider.

In another alternative implementation, user home location is not provided to search engine 103 by either mobile communication device 101 or communication cloud 102, and search engine 103 does not use user home location in ranking the query search results. In yet another alternative implementation, user home location information is provided to search engine 103 by either mobile communication device 101 or communication cloud 102, but the user home location information is not used by search engine 103 in ranking the query search results.

In one alternative embodiment of communication system 100 of FIG. 1, search engine 103 transmits all the search results to mobile client 101 in a single batch, rather than in multiple batches.

In one alternative embodiment of communication system 100 of FIG. 1, search engine 103 ranks the search results based only on the location information without regard to the relevance of other search parameters to the search results.

In one alternative embodiment of communication system 100 of FIG. 1, search engine 103 first ranks the search results based on the location information and then adjusts those rankings based on the relevance of the search results to other search parameters.

A particular embodiment of the invention has been described where a user uses a mobile communication device to perform a query search, and the current location of the mobile communication device is used in providing corresponding search results to the user. In one alternative embodiment, the users uses a stationary communication device to perform a query search, and the current location of the stationary communication device is used in providing corresponding search results to the user.

The present invention may be implemented as circuit-based processes, including possible implementation as a single integrated circuit (such as an ASIC or an FPGA), a multi-chip module, a single card, or a multi-card circuit pack. As would be apparent to one skilled in the art, various functions of circuit elements may also be implemented as processing steps in a software program. Such software may be employed in, for example, a digital signal processor, micro-controller, or general-purpose computer.

It will be further understood that various changes in the details, materials, and arrangements of the parts which have been described and illustrated in order to explain the nature of this invention may be made by those skilled in the art without departing from the scope of the invention as expressed in the following claims.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

Unless explicitly stated otherwise, each numerical value and range should be interpreted as being approximate as if the word "about" or "approximately" preceded the value of the value or range. As used in this application, unless otherwise explicitly indicated, the term "connected" is intended to cover both direct and indirect connections between elements.

For purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. The terms "directly coupled," "directly connected," etc., imply that the connected elements are either contiguous or connected via a conductor for the transferred energy.

Although the steps in the following method claims are recited in a particular sequence with corresponding labeling, unless the claim recitations otherwise imply a particular sequence for implementing some or all of those steps, those steps are not necessarily intended to be limited to being implemented in that particular sequence.

We claim:

1. A communication device having a current location and adapted to:
    (a) allow a user of the communication device to provide a search query having one or more search parameters;
    (b) automatically acquire location information indicating at least one of (i) the current location of the communication device and (ii) a home location for the user of the communication device;
    (c) transmit the search query and the location information via a communication network to a search engine, wherein the search engine is adapted to:
        (1) search a collection of documents using the one or more search parameters to obtain two or more search results, wherein each of the two or more search results corresponds to a different document in the collection of documents;
        (2) rank the search results based on the location information; and
        (3) transmit at least some of the ranked search results to the communication device; and
    (d) display the received ranked search results, wherein:
        the location information indicates the current location of the communication device;
        the search engine is further adapted to determine a current zone of interest based on the current location of the communication device;
        the search results are also ranked based on the current zone of interest;
        the current zone of interest has at least one of a shape and size based on the current location;
        the communication device has a velocity indicating a speed and a direction of the communication device;
        the location information further indicates the velocity of the communication device; and
        at least one of the shape and size of the current zone of interest is based on the velocity of the communication device.

2. A computer-implemented method for providing search results ranked based on location, the method comprising:
    receiving a search query having one or more search parameters provided by a user of a communication device having a current location;
    receiving location information corresponding to the communication device, wherein the location information indicates at least one of (i) the current location of the communication device and (ii) a home location for the user of the communication device;
    searching a computer-accessible collection of documents using the one or more search parameters to obtain two or more search results, wherein each of the two or more search results corresponds to a different document in the collection of documents;
    ranking the search results based on the location information; and transmitting at least some of the ranked search results to the communication device, wherein:
the location information indicates the current location of the communication device;
the search engine is further adapted to determine a current zone of interest based on the current location of the communication device;
the search results are also ranked based on the current zone of interest;
the current zone of interest has at least one of a shape and size based on the current location;
the communication device has a velocity indicating a speed and a direction of the communication device;
the location information further indicates the velocity of the communication device; and
the at least one of the shape and size of the current zone of interest is based on the velocity of the communication device.

3. A computer-implemented search engine for a communication network having a communication device with a current location, the search engine adapted to:
receive from the communication device a search query having one or more search parameters provided by a user of the communication device;
receive location information corresponding to the communication device, wherein the location information indicates at least one of (i) the current location of the communication device-and (ii) a home location for the user of the communication device;
search a computer-accessible collection of documents using the one or more search parameters to obtain two or more search results, wherein each of the two or more search results corresponds to a different document in the collection of documents;
rank the search results based on the location information; and
transmit at least some of the ranked search results to the communication device, wherein:
the location information indicates the current location of the communication device;
the search engine is further adapted to determine a current zone of interest based on the current location of the communication device;
the search results are also ranked based on the current zone of interest;
the current zone of interest has a shape and size based on the current location;
the communication device has a velocity indicating a speed and a direction of the communication device;
the location information further indicates the velocity of the communication device; and
at least one of the shape and size of the current zone of interest is based on the velocity of the communication device.

4. The invention of claim 3, wherein the shape of the current zone of interest is not based on the velocity of the communication device.

5. The invention of claim 3, wherein the size of the current zone of interest is based on the velocity of the communication device.

6. The invention of claim 5, wherein the search results are ranked based on both (i) the current location of the communication device and (ii) the home location for the user of the communication device.

7. The invention of claim 6, wherein:
at least two documents corresponding to the two or more search results have associated content location information and document-author home location information; and
the search results are ranked based on:
a comparison of the current location to the content location information; and
a comparison of the home location for the user to the document-author home location information.

8. The invention of claim 5, wherein:
at least two documents corresponding to the two or more search results have associated content location information; and
the search results are ranked based on a comparison of the current location to the content location information.

9. The invention of claim 5, wherein:
at least two documents corresponding to the two or more search results have associated document-author home location information; and
the search results are ranked based on a comparison of the home location for the user to the document-author home location information.

10. The invention of claim 5, wherein the home location for the user is different from the current location of the communication device.

11. The invention of claim 5, wherein the search engine also ranks the two or more search results based on the relevance of the corresponding documents to the search parameters.

12. The invention of claim 11, wherein:
the search engine first ranks the search results based on the relevance of the corresponding documents to the search parameters; and
the search engine then adjusts the rankings based on the location information.

13. The invention of claim 5, wherein:
the current zone of interest is a primary current zone of interest;
the search engine is adapted to determine one or more additional current zones of interest external to the primary zone of interest; and
the search results are also ranked based on the one or more additional current zones of interest.

14. The invention of claim 5 wherein the current zone of interest is a predetermined zone of interest having a predefined boundary.

15. The invention of claim 5, wherein:
the search engine is further adapted to generate, based on the current zone of interest, geographical markers including at least one of landmarks, postal codes, and phone numbers;
at least two documents corresponding to the two or more search results have associated content location information; and
the search engine compares the geographical markers to the content location information of the at least two documents to rank the search results based on the location information.

16. The invention of claim 5, wherein:
the search engine is further adapted to determine a home zone of interest based on the home location for the user; and
the search results are ranked based on the home zone of interest.

17. The invention of claim 16, wherein:
the home zone of interest is a primary home zone of interest;
the search engine is adapted to determine one or more additional home zones of interest external to the primary home zone of interest; and
the search results are also ranked based on the one or more additional home zones of interest.

18. The invention of claim 16, wherein the home zone of interest has a shape and size based on the home location for the user.

19. The invention of claim 5, wherein the collection of documents consists of blog posts available on the Internet.

20. The invention of claim 5, wherein:
at least two documents corresponding to the two or more search results have associated content location information and document-author home location information, wherein the content location information is in the form of at least one of addresses, landmarks, postal codes, and phone numbers;
the search engine is further adapted to determine a current zone of interest based on the current location of the communication device;
the search engine is further adapted to determine a home zone of interest based on the home location for the user;
the search engine is further adapted to generate, based on the current zone of interest, geographical markers including at least one of landmarks, postal codes, and phone numbers; and
the search results are ranked based on:
  (i) a comparison of the current zone of interest to the content location information;
  (ii) a comparison of the geographical markers to content location information; and
  (iii) a comparison of the home location for the user to the document-author home location information.

21. The invention of claim 1, wherein the size of the current zone of interest is based on the velocity of the communication device.

22. The invention of claim 2, wherein the size of the current zone of interest is based on the velocity of the communication device.

* * * * *